March 24, 1964    M. T. DIEAS    3,126,188
REMOVABLE SUPPORT LEG MOUNTING FITTINGS
Filed Oct. 23, 1961    2 Sheets-Sheet 1

INVENTOR.
MARION T. DIEAS
BY
*Hansen and Lane*,
ATTORNEYS.

March 24, 1964  M. T. DIEAS  3,126,188
REMOVABLE SUPPORT LEG MOUNTING FITTINGS
Filed Oct. 23, 1961  2 Sheets-Sheet 2
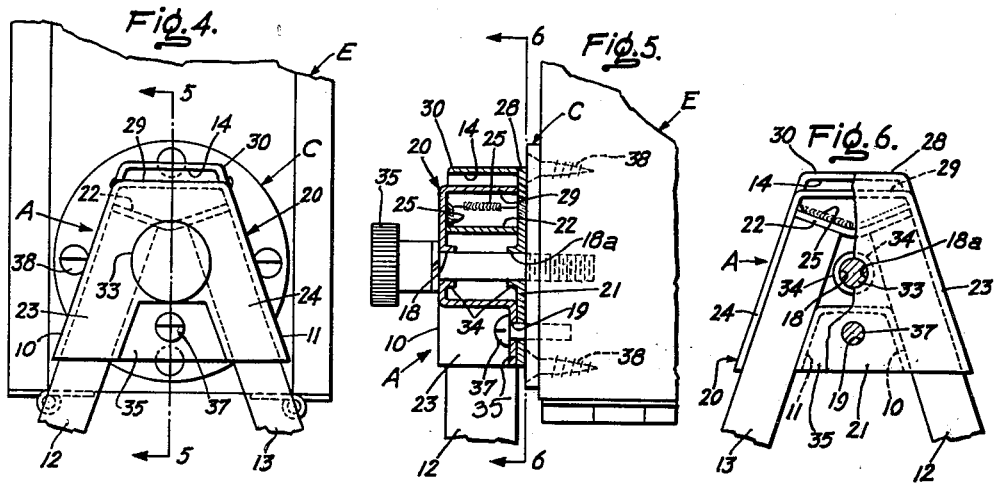
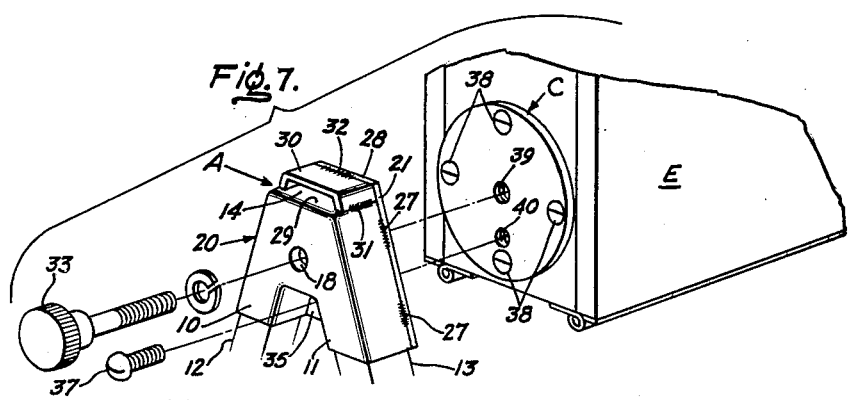
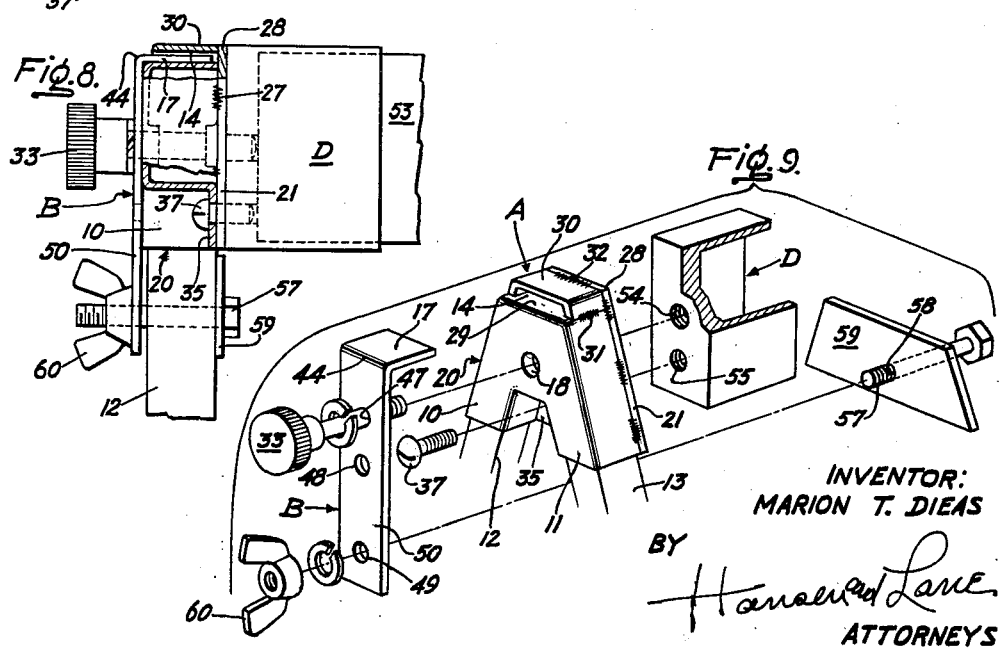
INVENTOR:
MARION T. DIEAS
BY
Hansen and Lane
ATTORNEYS United States Patent Office 3,126,188
Patented Mar. 24, 1964

3,126,188
REMOVABLE SUPPORT LEG MOUNTING
FITTINGS
Marion T. Dieas, 1092 Monroe St., Santa Clara, Calif.
Filed Oct. 23, 1961, Ser. No. 146,877
2 Claims. (Cl. 248—188)

The present invention relates to fittings, and pertains more particularly to a socketed leg fitting and adapters for adapting the same to a wide variety of uses.

Around a home, in camping, and in various other situations, it frequently is necessary or desirable to support objects of various types on legs, and attempts are frequently made to provide such objects with supporting legs of a temporary nature. Frequently such temporary legs are improvised in such a haphazard manner that the support provided by them is insecure, and sometimes dangerous.

An object of the present invention is to provide an improved, socketed, leg fitting.

Another object of the invention is to provide a socketed leg fitting having a pair of divergent leg receiving sockets therein, and formed and constructed for combination with accessories for application to a wide variety of objects and uses.

A further object of the invention is to provide a socketed leg fitting having a pair of angularly divergent sockets therein for receiving a pair of supporting legs, the fitting having a transverse, flat, socket in its apex end for receiving the lateral flange of an angle bracket.

A further object of the invention is to provide a socketed leg fitting having a pair of angularly divergent, leg receiving sockets therein, and having a face thereon formed for abutting engagement with an attachment secured to an object to be supported, the fitting and the attachment having holes therein adapted to register and to receive supporting and anchoring screws for temporarily attaching the leg fitting, in adjusted position, to such object.

A still further object of the invention is to provide a socketed leg fitting having a pair of divergent, leg receiving sockets therein, and having a laterally extending socket formed in the apex end thereof, an angle bracket of band iron being adapted to be inserted into the laterally extending socket and releasably attached to a leg clamping band for retaining the legs in their sockets.

These, and other objects and advantages of the invention, will be apparent from the following description and the accompanying drawings, wherein:

FIG. 4 is an enlarged side elevational view of the socketed, leg receiving fitting mounting on the camping box of FIG. 1, the box being shown with the covers thereof closed, portions being broken away.

FIG. 5 is a sectional view taken along line 5—5 of FIG. 4.

FIG. 6 is a sectional view taken along line 6—6 of FIG. 5, a portion of the side plate of the socketed leg fitting being broken away.

FIG. 7 is an exploded view in perspective of the structure of FIGS. 4–6.

FIG. 8 is an enlarged, vertical, medial sectional view taken through the left hand end fitting of FIG. 2 and its associated parts, portions being broken away, the rectangular socket and cross bar being shown in elevation.

FIG. 9 is an exploded, perspective view of the parts shown in FIGS. 2 and 8.

Figure 1:
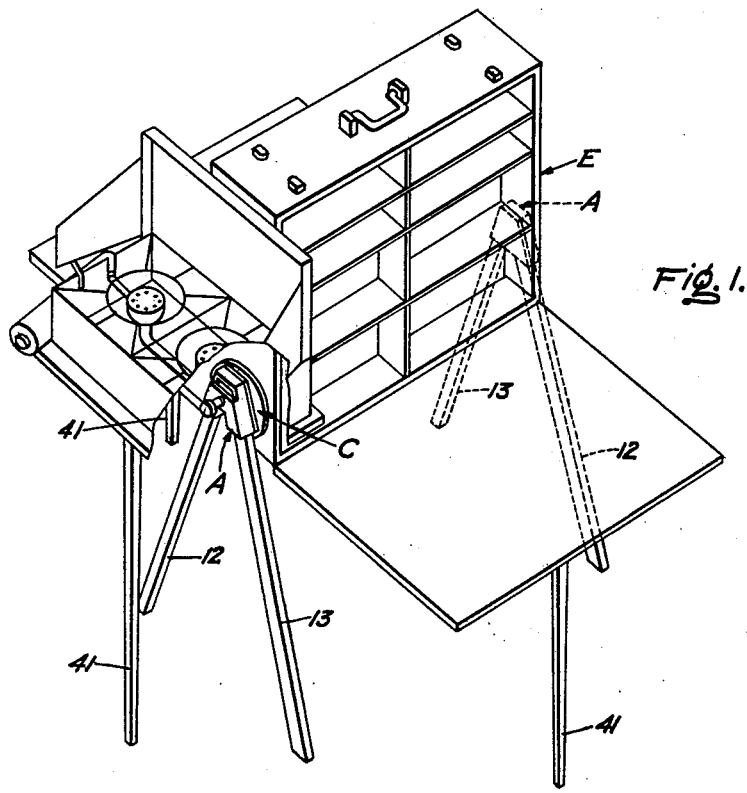
FIG. 1 is a perspective view of a socketed, leg receiving fitting embodying the invention as it appears when connected to an accessory fitting attached to a camping cabinet.

Briefly, the illustrated form of the invention comprises a leg receiving fitting A, which, as illustrated, is of truncated, triangular shape with a pair of downwardly divergent sockets 10 and 11 formed therein. The lower ends of the sockets 10 and 11 are open to receive the upper ends of a pair of support legs 12 and 13 in interfitted relation therein. The various parts of the invention will be described herein in the positions in which they appear in the drawings, so that the truncated apex of each leg receiving fitting A is in its upper end.

A flat, laterally disposed socket 14, of a size to receive therein the angularly bent end portion 17 of an angle fitting B is provided in the upper end of each leg receiving fitting A. Two screw receiving holes 18 and 19 (FIGS. 5 and 6) are provided in each leg receiving member A for attaching the latter to various accessory fittings, such as a circular mounting plate C (FIGS. 1 and 4–7) and, selectively, to the angle fitting B and a rectangular, socketed, cross bar fitting D (FIGS. 2, 8 and 9).

Referring to the drawings in greater detail, each socketed, leg receiving fitting A comprises a generally triangular, pan shaped member 20, with a correspondingly shaped, flat side plate 21 secured across the open side thereof by welds 27.

An angularly bent leg stop strip 22 is mounted in the pan shaped member 20, with two angularly divergent portions of said strip extending across the upper ends of divergent channel portions 23 and 24, formed in the pan shaped member 20 as shown in FIGS. 4–6. The stop strip 22 is secured in this position by welds 25.

The upper end of the flat side plate 21 preferably extends upwardly at 28 beyond the truncated apex 29 of the pan member 21 to conform with one side of a shallow, inverted U-shaped, band-metal clip 30. The ends of the latter are welded at 31 (FIGS. 4, 6 and 7) to the truncated apex of the pan member 20, and also at 32 to the top of the flat side plate 21 to form the laterally extending flat socket 14 for receiving the end portion 17 of the angle fitting B in fitted relation therein.

The hole 18 (FIG. 5) for receiving a thumb screw 33, is provided substantially centrally of the upper portion of the pan shaped member 20, and a similar, axially aligned hole 18a (FIGS. 5 and 6) is provided in the flat side plate 21. These holes 18 and 18a preferably are pierced in a well known manner with marginal reinforcing flanges 34 (FIGS. 5 and 6). The anchor screw hole 19 is provided substantially centrally through the web portion 35 of the pan shaped member 20 and the side plate 21 between the divergent channel portions 23 and 24 of the pan shaped member 20 to receive therein an anchor screw 37 (FIGS. 1 and 4–7).

Each circular mounting plate C for removably attaching a leg receiving fitting A to an object, such as the illustrated camping cabinet E (FIGS. 1 and 4–7) is applied, one to each end of such object, as by a plurality of wood screws 38. Each circular mounting plate C has a threaded hole 39 therein of a size to threadedly receive the thumb screw 33 when the latter is inserted through the axially aligned holes 18 and 18a in a leg receiving fitting A associated therewith. A second threaded hole 40 is also provided in each mounting plate C in position to threadedly receive an anchor screw 37, which is inserted through the anchor screw 19 in such leg receiving fitting A. The thumb screw 33 firmly attaches the leg receiving fitting A to the circular mounting plate C, while the anchor screw 37 prevents relative rotative movement between the leg receiving fitting A and an object, such as the cabinet E, to which the circular plate C is secured.

Figure 2:
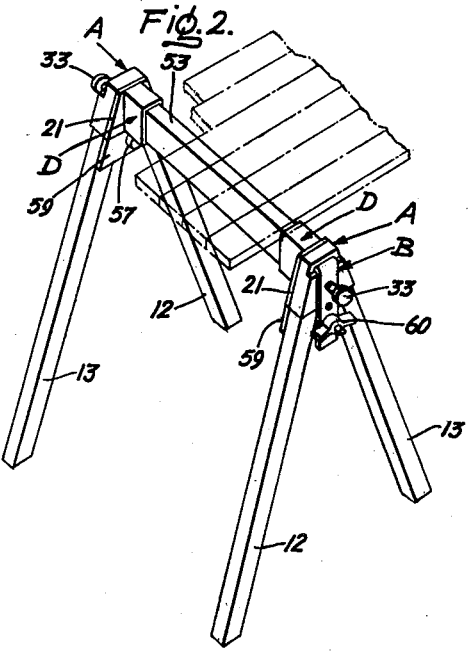
FIG. 2 is a perspective view of the socketed, leg receiving fitting of FIG. 1 as it appears when connected to a rectangular socketed fitting supporting a transverse bar to form a horse, the leg clamping attachments also being shown, and a plurality of boards being shown in broken lines, portions thereof being broken away.

In using the leg receiving fitting A as shown in FIG. 1, a pair of support legs 12 and 13 of a desired length are provided for each angle fitting A to be used. The upper end of each leg is shaped for fitted insertion into one of the converging sockets 10 or 11 of each fitting A.

With a pair of the circular mounting plates C attached to an object to be supported, such as the cabinet E, the leg receiving fittings A are attached to the mounting plates by inserting a thumb screw 33 and anchor screw 27 in each of the leg fittings A, and then screwing these screws firmly into their respective threaded holes 39 and 40 in the circular plates C. Legs 12 and 13 are then inserted into each of the sockets 10 and 11 of each leg receiving fitting A, and the box is stood upright on these legs as shown in FIG. 1. Folding props 41, (FIG. 1) form no part of the present invention, but their structure and use for supporting the box lids in horizontal position to provide a table are obvious from FIG. 1.

Figure 3:
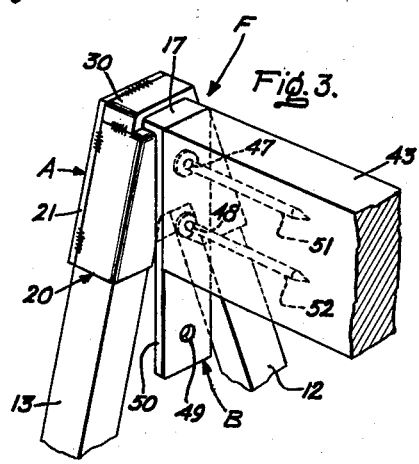
FIG. 3 is an enlarged, fragmentary, perspective view of the socketed, leg receiving fitting as it appears when connected to the angularly bent member, the latter being attached to an end of the wooden cross bar by a pair of spikes, the latter being shown in broken lines.

As illustrated in FIG. 3 the socketed leg receiving fitting A is the same as that shown in FIGS. 1 and 4–7 and described previously herein. As used in FIG. 3, however, an angle fitting B is secured to each end of a transverse bar 43, which may be of a desired size, for example a length of 2" x 4" lumber.

Each angle member B is of band metal, such as steel of suitable size and strength to support the load to be imposed thereon, and has a right angle bend 44 therein to form the short upper portion 17 of a size to fit into the transverse socket 14 of a leg receiving fitting A, and of a length to permit it to be inserted fully therein. A plurality of holes, for example three, 47, 48 and 49 (FIGS. 3 and 7) are provided in this upright portion 50 of each angle fitting B, and two nails 51 and 52 (FIG. 3) are inserted through the uppermost two holes 47 and 48, and are driven home endwise into the 2" x 4" bar 43 to secure the angle bracket B thereto. With an angle bracket B thus secured to each end of the bar 43 of FIG. 3, when the short bent portions 17 of said angle fittings are inserted into the lateral sockets 14 of a pair of leg receiving fittings A, with legs 12 and 13 fitted therein, the horse F of FIG. 3 is provided.

The leg receiving fittings A as used in FIGS. 3 and 7–9 are each connected to a rectangular socket member D of a size to receive therein the end of a transvere bar 53 of a desired size, for example, a piece of 2" x 4" lumber. A pair of threaded holes 54 and 55 are provided in the closed end of each rectangular socket fitting D, these holes being of suitable sizes, and so located, as to threadedly receive the thumb screw 33 and anchor screw 37 respectively therein when the closed end of each socket fitting D is mounted against the side plate 21 of a leg receiving fitting A as shown in FIG. 8.

An angle fitting B may then have its short portion 17 inserted into the flat socket 14 of each leg receiving fitting A, as shown in FIGS. 2 and 8, and a clamp screw 57 inserted through hole 59 in the lower end portion of the longer portion 50 of each angle fitting B, and also through a hole 58 in a leg clamping strip 59, which is mounted transversely across the opposite sides of the legs 12 and 13 from the angle fitting B. A wing nut 60 is then screwed onto the projecting, threaded end portion of each clamp screw 57, and is screwed down to draw the transverse leg clamping strip 59 into frictional, anchoring engagement with the legs 12 and 13 which it spans. The legs are thus held firmly in their sockets, so that there is no danger of their falling off when the horse, or whatever other structure may be made with this assembly, is lifted clear of the ground.

The invention provides a simple, versatile, strong mechanism for providing demountable legs for a wide variety of objects. The fittings comprising the invention are simple and inexpensive to manufacture, and are adaptable to many situations and uses.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims:

1. A two part fitting for mounting a pair of support legs on an upright surface of any of a wide variety of objects, said fitting comprising
   (a) a leg receiving member having a flat top surface and a pair of downwardly diverging leg receiving sockets therein, the center lines of said sockets defining a plane,
   (b) a shallow, inverted U-shaped member secured transversely across the top of the leg receiving member to form therebetween a transverse socket extending substantially perpendicularly to the plane defined by the center lines of the leg receiving sockets,
   (c) a stop member in each leg receiving socket to limit the insertion of a support leg therein,
   (d) and an angle bracket of a cross sectional size and shape to fit snugly into the transverse socket in the leg receiving fitting,
   (e) said angle bracket having two legs thereof disposed at right angles to each other,
   (f) a first leg thereof being of a size and shape to fit snugly for a substantial distance into the transverse socket of the leg receiving fitting,
   (g) the second leg thereof being of substantial length
   (h) and means for securely connecting the second leg of the angle bracket firmly to an upright surface of such object, whereby, when the second leg of the angle bracket is so connected to such object, with a pair of support legs inserted one in each of the leg sockets of the leg receiving fitting, and the first leg of the angle bracket is inserted firmly in the transverse socket in the leg receiving fitting, the support legs will be thereby firmly attached to such object.

2. A two part fitting for mounting a pair of support legs on an upright surface of any of a wide variety of objects, said fitting comprising
   (a) a leg receiving member having a flat top surface and a pair of downwardly diverging leg receiving sockets therein, the center lines of said sockets defining a plane,
   (b) an element spaced upwardly from the top surface of the leg receiving member and forming a transverse socket extending substantially perpendicularly to the plane defined by the center lines of the leg receiving sockets,
   (c) and an angle bracket of a cross sectional size and shape to fit snugly into the transverse socket in the leg receiving fitting,
   (d) said angle bracket having two legs thereof disposed at right angles to each other,
   (e) a first leg thereof being of a size and shape to fit snugly for a substantial distance into the transverse socket of the leg receiving fitting,
   (f) the second leg thereof being of greater length than the height of the socketed leg receiving member and having a hole therein to receive a fastening member for securing the angle bracket firmly to an upright surface of such object, whereby, when the second leg of the angle bracket is so secured to such object, with a pair of support legs inserted one in each of the leg sockets of the leg receiving fitting, and the first leg of the angle bracket is inserted firmly in the transverse socket in the leg receiving fitting, the support legs will be thereby firmly attached to such object.

References Cited in the file of this patent

UNITED STATES PATENTS

| | | |
|---|---|---|
| 936,007 | Mauborgne | Oct. 5, 1909 |
| 1,792,612 | Staley | Feb. 17, 1931 |
| 1,932,959 | Denman | Oct. 31, 1933 |
| 2,911,242 | Bickerstaff | Nov. 3, 1959 |